No. 877,746. PATENTED JAN. 28, 1908.
A. P. SMITH.
SAND MOLDING MACHINE.
APPLICATION FILED JULY 2, 1907.

5 SHEETS—SHEET 1.

WITNESSES
INVENTOR

No. 877,746. PATENTED JAN. 28, 1908.
A. P. SMITH.
SAND MOLDING MACHINE.
APPLICATION FILED JULY 2, 1907.

5 SHEETS—SHEET 3.

WITNESSES
Alvin J. White
W. P. Burke

INVENTOR
Arthur Phillips Smith

ATTY

No. 877,746. PATENTED JAN. 28, 1908.
A. P. SMITH.
SAND MOLDING MACHINE.
APPLICATION FILED JULY 2, 1907.

5 SHEETS—SHEET 4.

WITNESSES
Alvin J. White
W. P. Burk

INVENTOR
Arthur Phillips Smith
BY J. M. Phelan
ATTY

No. 877,746. PATENTED JAN. 28, 1908.
A. P. SMITH.
SAND MOLDING MACHINE.
APPLICATION FILED JULY 2, 1907.

5 SHEETS—SHEET 5.

WITNESSES

INVENTOR
Arthur Phillips Smith
BY
ATTY

UNITED STATES PATENT OFFICE.

ARTHUR PHILLIPS SMITH, OF COVENTRY, ENGLAND.

SAND-MOLDING MACHINE.

No. 877,746.  Specification of Letters Patent.  Patented Jan. 28, 1908.

Application filed 2, 1907. Serial No. 381,875.

*To all whom it may concern:*

Be it known that I, ARTHUR PHILLIPS SMITH, subject of Great Britain, residing at Cox street, Coventry, in the county of Warwick, England, have invented new and useful Improvements Relating to Sand-Molding Machines, of which the following is a specification.

This invention relates to sand molding machines for use by iron and other founders, my object being to produce a simple and compact machine adapted for ready and convenient manipulation by an unskilled operative, with considerable less fatigue than is usually experienced with machines of this class.

Figure 1:
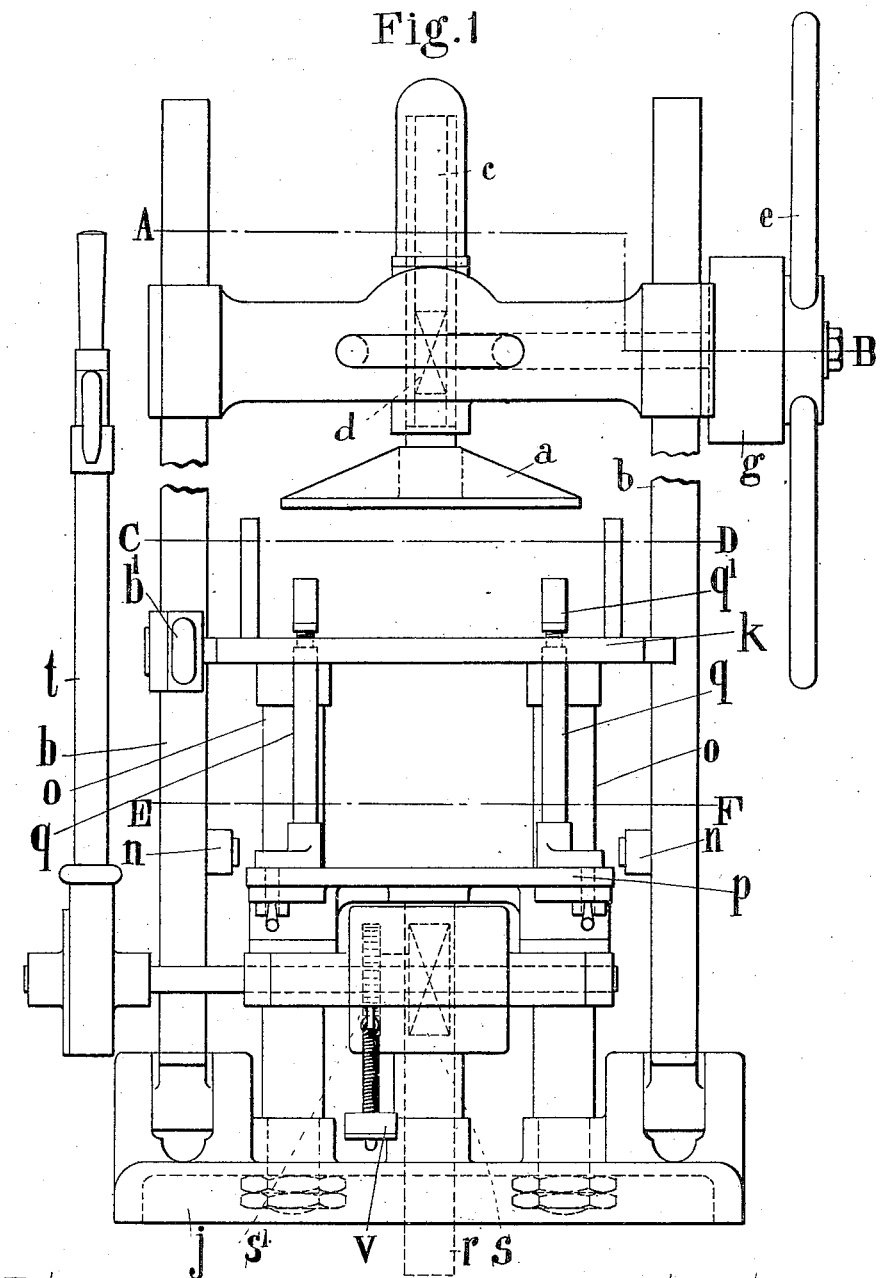
Figure 2:
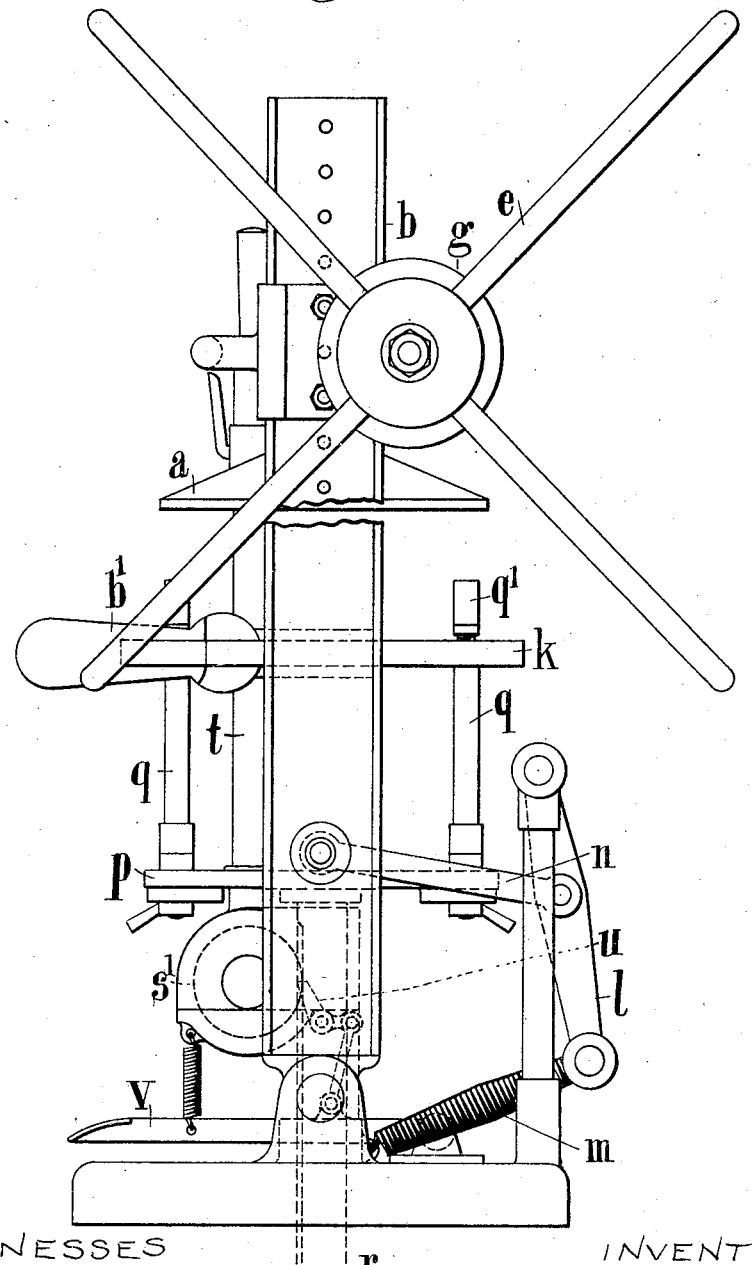
Figure 3:
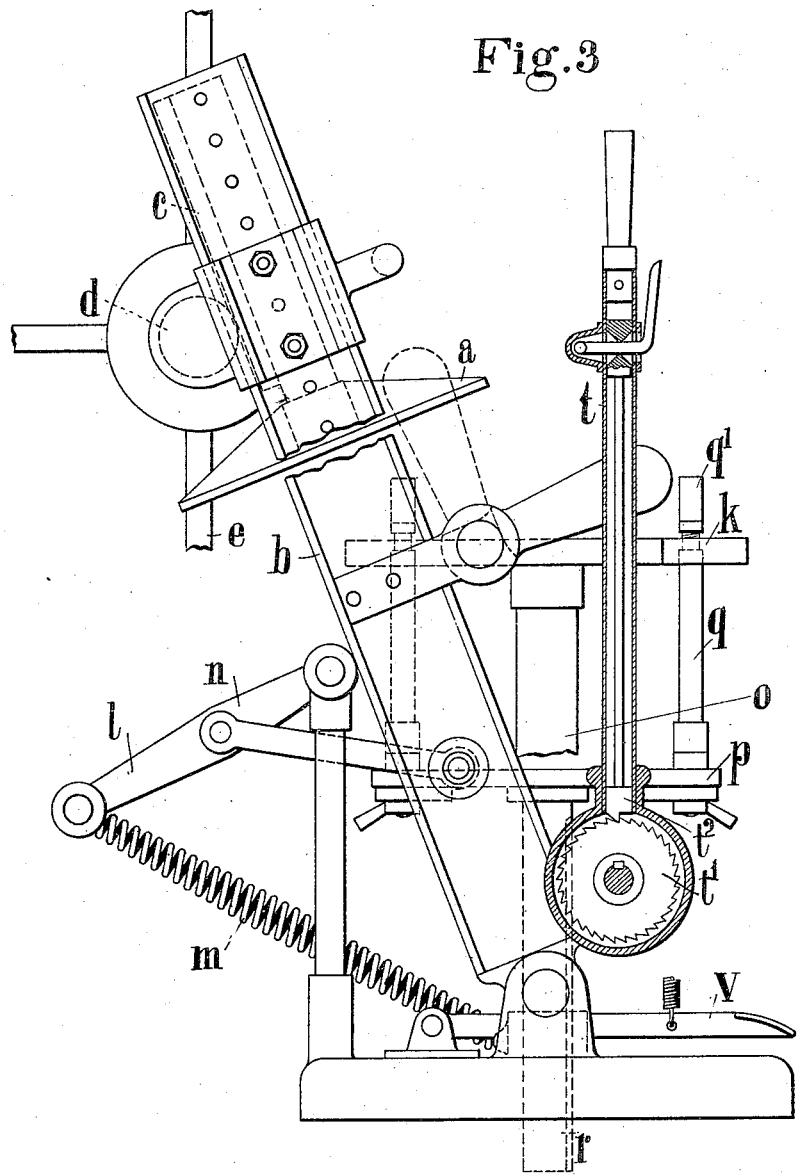
Figure 4:
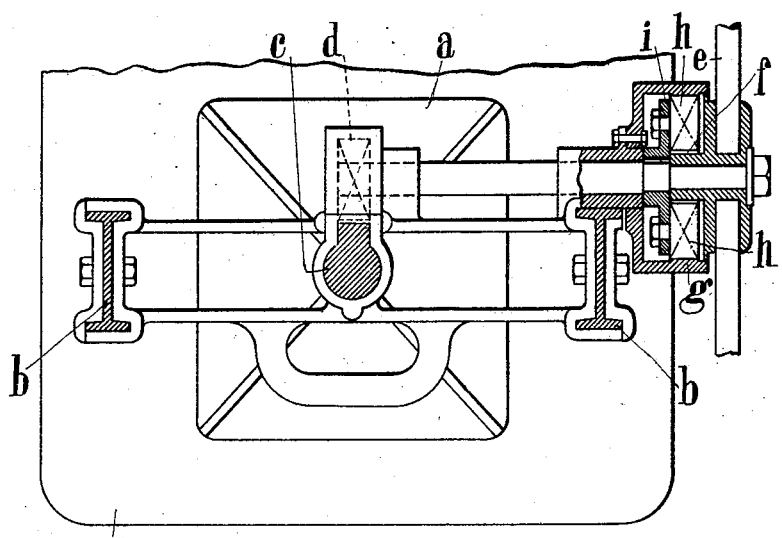
Figure 5:
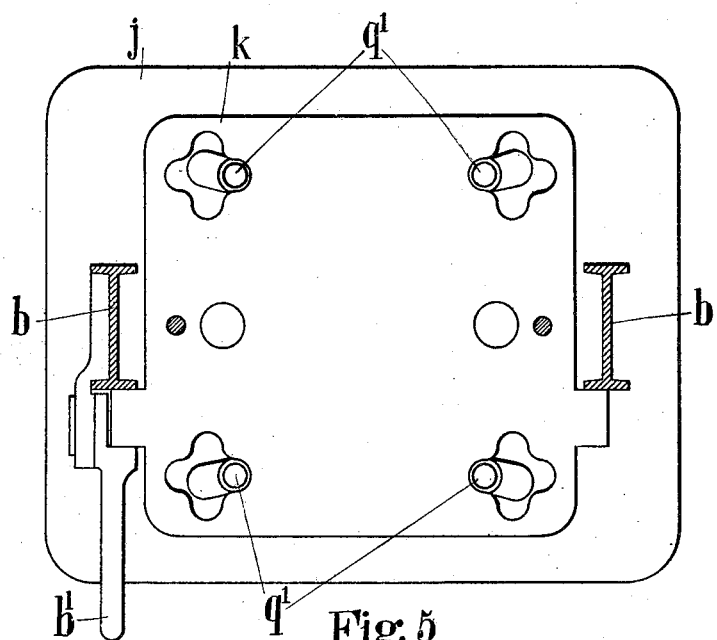
Figure 6:
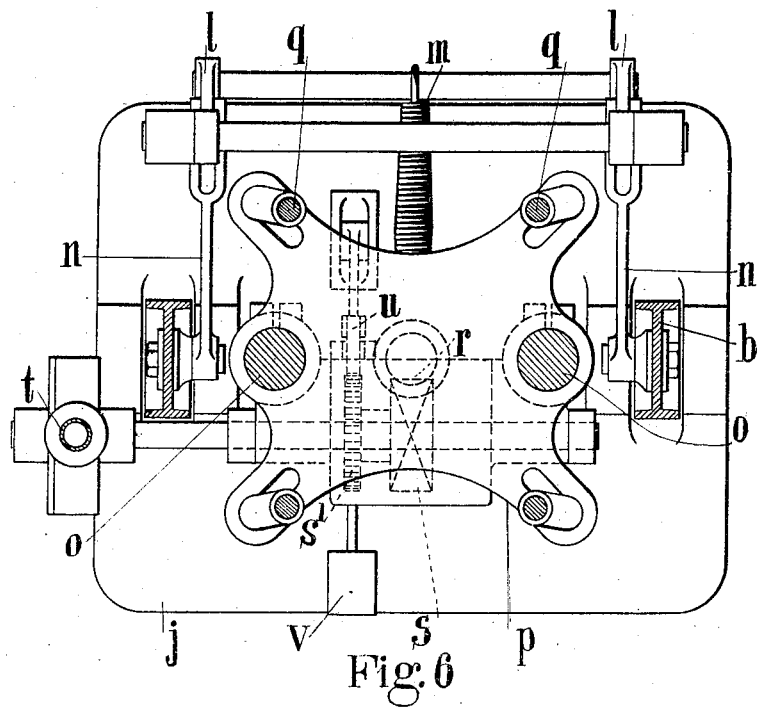

Referring to the five accompanying sheets of explanatory drawings:—Figure 1 is a front elevation of a sand molding machine constructed in accordance with this invention. Figs. 2 and 3 are side elevations taken on opposite sides of the machine, the frame in Fig. 3 being shown in the out of service position. Figs. 4, 5 and 6 are respectively sectional plans on the lines A B, C D, and E'F, Fig. 1.

The same reference letters in the different views indicate the same parts.

In the construction of a molding machine as illustrated, I adjustably mount a ramming head $a$ between a pair of upright guides or columns $b$, consisting preferably of suitable lengths of rolled steel of H or other section or steel tubes. With the ram I arrange a rack $c$ and pinion $d$ and other suitable gear or mechanism $e.$ $g.$ an epicyclic gear, enabling the operative to conveniently apply the required movement and pressure to the ramming head by means of a handle $e$. The epicyclic gear illustrated in the drawings consists of a pinion $f$ secured to the handle $e$, a fixed annulus or internally toothed wheel $g$, and planet pinions $h$ mounted on a carrier $i$ secured to the spindle of the pinion $d$. Any other suitable gear may be employed if required and may also be arranged in any convenient and ordinary manner to give a rapid motion to the ramming head to and from the box and a slow motion when in contact with the sand.

The ramming head supporting frame, formed by the aforesaid guide columns $b$, is pivotally mounted at the base $j$ of the machine, so that, together with the ramming head and the operative mechanism therefor, it may be swung clear of the work supporting table or platen $k$ as shown at Fig. 3 or brought into the service position at which the ramming head is in vertical alinement above the said table as shown at Figs. 1 and 2. A suitable pivoted catch or sustaining piece $b'$ is arranged for maintaining the pivotally mounted frame in the said service position, the catch being attached to the frame and arranged to engage the front edge of the table $k$ as shown at Fig. 5.

The pivotal or swinging frame and the ramming head with its operative mechanism carried by the said frame, are balanced by arms or levers $l$ connected with a spring $m$ and arranged in connection with the frame $b$ through the medium of links $n$ to enable the required swinging movement to be imparted to the frame with but little effort by the operative. When the frame is thrown back as shown at Fig. 3 the spring is extended and therefore imposes a thrust on the links $n$ which assists the return of the frame to the vertical position.

The platen or table $k$ on which the molding box is placed, is supported on fixed stems or columns $o$ projecting above the base of the machine. The said stems serve also as guides for an auxiliary platen $p$ or like part carrying adjustable lifters $q$ and adapted to be raised and lowered through the medium of a rack $r$ and pinion $s$ or an equivalent device. The said lifters consist preferably of struts or rods having adjustable caps $q'$ and are secured at their lower end to the auxiliary platen. The lifters are also adapted to project at the upper end through apertures in the main table or platen $k$. The auxiliary platen with its lifters is employed for raising the molding boxes, stripping plates or stools, as required. For the operation of the auxiliary platen, a hand lever $t$ is provided, the latter being connected to the spindle of the pinion $s$ through the ratchet $t'$ and pawl $t^2$ shown in detail at Fig. 3. By means of the ratchet and pawl the lever $t$ can be readily adjusted by the operative to the best position for convenient manipulation of the same.

To sustain the auxiliary platen at any required height a ratchet $s'$ is secured with the pinion $s$ and a pawl $u$ is arranged for automatic engagement therewith. Withdrawal of the pawl to release the platen is effected by a foot lever or pedal $v$.

The operating mechanism for the platen $p$ and the head $a$ are totally inclosed as shown for the exclusion of sand and dust.

The molding operations with my machine constructed as aforesaid are as follows:—The ramming head *a* having been swung back out of position where it is supported by any suitable stay or stop piece, the molding box with the pattern or pattern plate are placed in position on the main table or platen *k* and filled with molding sand. The ramming head is then pulled or brought back to its service position and the ramming movement applied thereto by the operative through the medium of the gear or mechanism and handle aforesaid. At the conclusion of such ramming operation the ramming head is withdrawn and subsequently swung out of position. The pattern or pattern plate is loosened by the application of a vibratory movement thereto in any known manner and an elevating movement is afterwards applied to the auxiliary platen *p* by means of the handle *t* whereby the struts or like parts *g* projecting above the same are caused to lift the box containing the mold, with or without the aid of stripping plates or stools, clear of the pattern in so steady a manner as to effectually avoid any damage to the mold. The box is lifted to the required extent to permit of its being moved from the machine. The mold is then in a condition for use in casting. On the lowering of the auxiliary platen *p* by means of the pedal *v*, the cycle of operations is completed and the machine ready for a repetition of such cycle with another box.

Instead of the movements of the ram and of the auxiliary platen being imparted by the operative, the said movements can be readily imparted through the medium of an electric motor, belting or other transmitters from a line shaft or otherwise.

Having thus described my invention what I claim and desire to secure by Letters Patent is:—

1. In sand molding machines, the combination comprising a work table, a ramming head, supports having the said head mounted thereon, a rack and pinion in conjunction with the ramming head, a work lifting platten adapted to slide beneath the work table, and a rack and pinion in conjunction with the said platen, substantially as set forth.

2. In sand molding machines, the combination comprising a work table, a ramming head, supports having the said head mounted thereon, a rack and pinion and operating handle in conjunction with the head, a work lifting platen adapted to slide beneath the work table, a rack and pinion in conjunction with the lifting platen, a platen operating handle, a ratchet and pawl between the said handle and the platen pinion, a ratchet and pawl adapted to sustain the lifting platen in an elevated position, and a pedal arranged to operate the last named pawl, substantially as set forth.

3. In sand molding machines, the combination comprising a work table, supporting columns for said table, a ramming head, a pivotal supporting frame having the said head mounted thereon, a rack and pinion and operating handle in conjunction with the ramming head, an epicyclic train of gear wheels between the operating handle and the rack and pinion, a spring device adapted to counter-balance the weight of the supporting frame when in an inclined position, a work lifting platen mounted on the columns of the work table, lifting struts secured to the platen and passing through the work table, a rack and pinion and operating handle, adapted to actuate the platen, a ratchet and pawl in conjunction with the said platen actuating handle, a ratchet and pawl for sustaining the platen in an elevated position, and a pedal lever connected with the last named pawl, substantially as set forth.

In testimony whereof I have signed my name to this specification in the presence of two subscribing witnesses.

ARTHUR PHILLIPS SMITH.

Witnesses:
    JOHN MORGAN,
    HARRY DAVIS.